(12) United States Patent
Zhang et al.

(10) Patent No.: US 11,887,354 B2
(45) Date of Patent: Jan. 30, 2024

(54) WEAKLY SUPERVISED IMAGE SEMANTIC SEGMENTATION METHOD, SYSTEM AND APPARATUS BASED ON INTRA-CLASS DISCRIMINATOR

(71) Applicant: INSTITUTE OF AUTOMATION, CHINESE ACADEMY OF SCIENCES, Beijing (CN)

(72) Inventors: Zhaoxiang Zhang, Beijing (CN); Tieniu Tan, Beijing (CN); Chunfeng Song, Beijing (CN); Junsong Fan, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 286 days.

(21) Appl. No.: 17/442,697

(22) PCT Filed: Jul. 2, 2020

(86) PCT No.: PCT/CN2020/099945
§ 371 (c)(1),
(2) Date: Sep. 24, 2021

(87) PCT Pub. No.: WO2021/243787
PCT Pub. Date: Dec. 9, 2021

(65) Prior Publication Data
US 2022/0180622 A1    Jun. 9, 2022

(30) Foreign Application Priority Data

Jun. 5, 2020 (CN) .......................... 202010506805.9

(51) Int. Cl.
*G06V 10/40* (2022.01)
*G06V 10/764* (2022.01)
(Continued)

(52) U.S. Cl.
CPC ............ *G06V 10/765* (2022.01); *G06T 7/174* (2017.01); *G06V 10/40* (2022.01); *G06V 10/776* (2022.01);
(Continued)

(58) Field of Classification Search
CPC .. G06V 10/765; G06V 10/40; G06V 10/7747; G06V 10/776; G06V 20/70;
(Continued)

(56) References Cited

U.S. PATENT DOCUMENTS

2010/0332425 A1    12/2010   Tuzel et al.
2019/0295261 A1*    9/2019   Kang ................... G06V 10/764
(Continued)

FOREIGN PATENT DOCUMENTS

CN    107564025 A    1/2018
CN    108596240 A    9/2018
(Continued)

OTHER PUBLICATIONS

Mojtaba Seyedhosseini, et al., Semantic Image Segmentation with Contextual Hierarchical Models, IEEE Transactions on Pattern Analysis and Machine Intelligence, 2015, 951-964, 38(5).
(Continued)

*Primary Examiner* — John Villecco
*Assistant Examiner* — Han Hoang
(74) *Attorney, Agent, or Firm* — Bayramoglu Law Offices LLC

(57) ABSTRACT

A weakly supervised image semantic segmentation method based on an intra-class discriminator includes: constructing two levels of intra-class discriminators for each image-level class to determine whether pixels belonging to the image class belong to a target foreground or a background, and using weakly supervised data for training; generating a pixel-level image class label based on the two levels of
(Continued)

intra-class discriminators, and generating and outputting a semantic segmentation result; and further training an image semantic segmentation module or network by using the label to obtain a final semantic segmentation model for an unlabeled input image. By means of the new method, intra-class image information implied in a feature code is fully mined, foreground and background pixels are accurately distinguished, and performance of a weakly supervised semantic segmentation model is significantly improved under the condition of only relying on an image-level annotation.

17 Claims, 2 Drawing Sheets

(51) Int. Cl.
  *G06T 7/174* (2017.01)
  *G06V 10/774* (2022.01)
  *G06V 20/70* (2022.01)
  *G06V 10/776* (2022.01)
(52) U.S. Cl.
  CPC .......... *G06V 10/7747* (2022.01); *G06V 20/70* (2022.01); *G06T 2207/20021* (2013.01); *G06T 2207/20081* (2013.01)
(58) Field of Classification Search
  CPC .................. G06V 10/267; G06T 7/174; G06T 2207/20021; G06T 2207/20081; G06T 2207/20084; G06T 7/194; G06T 7/11; G06F 18/214; G06F 18/24; G06F 18/254; G06N 3/045; G06N 3/08
  See application file for complete search history.

(56) References Cited

U.S. PATENT DOCUMENTS

2019/0377972 A1* 12/2019 Liu .......................... G06F 18/41
2020/0234110 A1* 7/2020 Singh ....................... G06N 3/08

FOREIGN PATENT DOCUMENTS

| CN | 109255790 A | 1/2019 |
| CN | 109784424 A | 5/2019 |
| CN | 109993173 A | 7/2019 |
| CN | 110443818 A | 11/2019 |
| CN | 110880001 A | 3/2020 |

OTHER PUBLICATIONS

Xu Shukui et al., Image semantic segmentation of weakly supervised model with bounding box annotations data, Journal of National University of Defense Technology, 2020, 187-193, vol. 42 No. 1.

* cited by examiner

WEAKLY SUPERVISED IMAGE SEMANTIC SEGMENTATION METHOD, SYSTEM AND APPARATUS BASED ON INTRA-CLASS DISCRIMINATOR

CROSS REFERENCE TO THE RELATED APPLICATIONS

This application is the national phase entry of International Application No. PCT/CN2020/099945, filed on Jul. 2, 2020, which is based upon and claims priority to Chinese Patent Application No. 202010506805.9, filed on Jun. 5, 2020, the entire contents of which are incorporated herein by reference.

TECHNICAL FIELD

The present invention belongs to the field of deep learning, computer vision and pattern recognition, and more particularly, relates to a weakly supervised image semantic segmentation method, system and apparatus based on an intra-class discriminator.

BACKGROUND

Weakly supervised semantic segmentation is a widely used and challenging computer vision task. A semantic segmentation task usually requires a lot of manpower to complete fine manual annotation of training images, and then a deep learning network is trained. The weakly supervised semantic segmentation focuses on using only cheap and easy-to-obtain rough annotations to train the deep learning network, so as to reduce reliance on manual labor. However, since only rough annotations are used, the weakly supervised semantic segmentation usually faces problems such as incomplete target prediction and inaccurate positioning.

At present, in the art, a model for estimating a target segmentation result is usually obtained through learning based on image-level class information. However, this model focuses more on a difference between images, i.e., typically focuses on the most easily recognizable part, and is thus difficult to obtain a complete estimation of an entire object.

In general, it is difficult to obtain a relatively complete target segmentation result in case of image-level weakly supervised annotation of data in the prior art, and consequently, thereby causing problems such as incomplete target prediction and inaccurate positioning under the weakly supervised semantic segmentation.

SUMMARY

To resolve the foregoing problem in the prior art, namely, a problem of inaccurate semantic segmentation caused by rough annotations used by weak supervision, the present invention provides a weakly supervised image semantic segmentation method based on an intra-class discriminator, where the semantic segmentation method includes:

extracting a feature image of a to-be-processed image through a feature extraction network, and obtaining an image semantic segmentation result of the to-be-processed image through an image semantic segmentation module, where the image semantic segmentation module is obtained through training based on a training image set and corresponding accurate pixel-level class labels, where the accurate pixel-level class labels are obtained through a first intra-class discriminator and a second intra-class discriminator based on the training image set and corresponding image-level class labels; the first intra-class discriminator and the second intra-class discriminator are separately constructed based on a deep network, and a method for training the first intra-class discriminator and the second intra-class discriminator includes:

step S10: extracting a feature image of each image in the training image set through the feature extraction network to obtain a training feature image set, and constructing a first loss function of the first intra-class discriminator and a second loss function of the second intra-class discriminator, respectively;

step S20: training the first intra-class discriminator based on the training feature image set, the corresponding image-level class labels and the first loss function to obtain preliminary pixel-level foreground and background labels corresponding to all classes of each image in the training image set;

step S30: training the second intra-class discriminator based on the training feature image set, the corresponding preliminary pixel-level foreground and background labels and the second loss function to obtain accurate pixel-level foreground and background labels corresponding to all the classes of each image in the training image set; and step S40: generating the accurate pixel-level class labels based on the accurate pixel-level foreground and background labels corresponding to all the classes of each image in the training image set and the corresponding image-level class labels.

In some example embodiments, step S20 may include:

step S21: for each image-level class label c of each feature image in the training feature image set, setting a direction vector $w_c$, using a pixel in a direction of the vector $w_c$ as a foreground pixel of a class c, and using a pixel in an opposite direction of the vector $w_c$ as a background pixel of the class c;

step S22: calculating a first loss value based on the direction vector $w_c$ and the training feature image set, and updating $w_c$ based on the first loss value; and step S23: repeatedly performing step S21 and step S22 until a set first quantity of times of training is reached, to obtain the trained first intra-class discriminator and the preliminary pixel-level foreground and background labels corresponding to all the classes of each image in the training image set.

In some example embodiments, step S30 may include:

step S31: calculating a second loss value based on the preliminary pixel-level foreground and background labels $B_{i,k,c}$ corresponding to all the classes of each image in the training image set, and the training feature image set, and updating a parameter of the feature extraction network based on the second loss value; and step S32: repeatedly performing step S31 until a set second quantity of times of training is reached, to obtain the trained second intra-class discriminator and the accurate pixel-level foreground and background labels corresponding to all the classes of each image in the training image set.

In some example embodiments, before step S30, the weakly supervised semantic segmentation method further includes: finely adjusting the preliminary pixel-level foreground and background labels, where a method thereof may include:

finely adjusting the preliminary pixel-level foreground and background labels by one or more methods including averaging in a superpixel and using a conditional random field.

In some example embodiments, the first loss function may be:

$$L(X1) = -\frac{1}{NHW} \sum_{i}^{N} \sum_{k}^{HW} \sum_{c}^{C} y_{i,c}(w_c^T x_{i,k})^2$$

where N represents a quantity of images in the training image set; H and W respectively represent a height and a width of a feature image of a training image; C represents a quantity of the image-level class labels in the training image set; $y_{i,c}$ represents an image-level label corresponding to a $c^{th}$ class of an $i^{th}$ image, $\hat{w}_c$ represents a direction vector of an image-level class label c before normalization, $$w_c = \frac{\hat{w}_c}{\|\hat{w}_c\|}$$

represents a direction vector of the image-level class label c after normalization, $w_c^T$ is a transpose of $w_c$; and $x_{i,k}$ represents a feature corresponding to a $k^{th}$ pixel position in a feature image of the $i^{th}$ image in the training image set.

In some example examples, the second loss function may be:

$$L(X2) = -\frac{1}{NHW}$$
$$\sum_{i=1}^{N} \sum_{k=1}^{HW} \sum_{c=1}^{C} y_{i,c}[B_{i,k,c}\log\sigma(S_{i,k,c}) + (1 - B_{i,k,c})\log(1 - \sigma(S_{i,k,c}))]$$

where N represents a quantity of images in the training image set; H and W respectively represent a high and a width of a feature image of a training image; C represents a quantity of image-level class labels in the training image set; $y_{i,c}$ represents an image-level label corresponding to a $c^{th}$ class of an $i^{th}$ image; $B_{i,k,c}$ represents pixel-level foreground and background prediction results of the first intra-class discriminator after fine adjustment; $S_{i,k,c}$ represents prediction results of the second intra-class discriminator; and σ is a Sigmoid function.

In some example examples, the first intra-class discriminator and the second intra-class discriminator may further be trained by using one of a Softmax classification loss function and a mean square error (MSE) regression loss function.

In another aspect of the present invention, a weakly supervised image semantic segmentation system based on an intra-class discriminator is provided. Based on the foregoing weakly supervised image semantic segmentation method based on an intra-class discriminator, the semantic segmentation system includes an input module, a feature extraction module, an image semantic segmentation module, and an output module, where the input module is configured to obtain a to-be-processed image or obtain a training image set and corresponding image-level class labels;

the feature extraction module is configured to extract a feature image of the to-be-processed image or extract a feature image set corresponding to the training image set;

the image semantic segmentation module is configured to obtain an image semantic segmentation result corresponding to the to-be-processed image based on the feature image corresponding to the to-be-processed image; and the output module is configured to output the image semantic segmentation result corresponding to the to-be-processed image, where the image semantic segmentation module is obtained through training based on the training image set and the corresponding accurate pixel-level class labels; and the accurate pixel-level class labels are obtained through a first intra-class discriminator, a second intra-class discriminator and a class label generation module based on the training image set and the corresponding image-level class labels;

the first intra-class discriminator includes a first loss calculation module and a first circulation module; the first loss calculation module calculates a first loss value based on a training feature image set, the corresponding image-level class labels, and a first loss function; and the first circulation module is configured to update a parameter of the first intra-class discriminator and perform cyclic training until a set first quantity of times of training is reached, to obtain the trained first intra-class discriminator and preliminary pixel-level foreground and background labels corresponding to all classes of each image in the training image set;

the second intra-class discriminator includes a second loss calculation module and a second circulation module; the second loss calculation module calculates a second loss value based on the training feature image set, corresponding preliminary pixel-level foreground and background labels of all the classes, and a second loss function; and the second circulation module is configured to update a parameter of the second intra-class discriminator and perform cyclic training until a set second quantity of times of training is reached, to obtain the trained second intra-class discriminator and accurate pixel-level foreground and background labels corresponding to all the classes of each image in the training image set; and the class label generation module is configured to generate the accurate pixel-level class labels based on the accurate pixel-level foreground and background labels corresponding to all the classes of each image in the training image set and the corresponding image-level class labels.

In a third aspect of the present invention, a storage apparatus is provided, and stores a plurality of programs, where the programs are configured to be loaded and executed by a processor to implement the foregoing weakly supervised image semantic segmentation method based on an intra-class discriminator.

In a fourth aspect of the present invention, a processing apparatus is provided, and includes a processor and a storage apparatus. The processor is configured to execute each program. The storage apparatus is configured to store a plurality of programs, where the programs are configured to be loaded and executed by the processor to implement the foregoing weakly supervised image semantic segmentation method based on an intra-class discriminator.

Advantages of the Present Invention:

(1) In the weakly supervised image semantic segmentation method based on an intra-class discriminator in the present invention, two levels of intra-class discriminators are constructed. Based on feature encoding of an image, in combination with the weakly supervised image-level class labels, whether feature image pixels of classes belong to foregrounds or backgrounds of the classes is preliminarily determined by a first-level intra-class discriminator. On this basis, whether the feature image pixels of the classes belong to the foregrounds or the backgrounds of the classes is determined again by a second-level intra-class discriminator. In combination with image-level class labels of original images, the accurate pixel-level class labels of the images are obtained. This may be used as a semantic segmentation result output. The image semantic segmentation module or network may be further trained based on the accurate pixel-level class labels, to obtain an image semantic segmentation module or the network having better performance and a more accurate semantic segmentation result with a weakly supervised label, and generate a relatively complete target semantic segmentation result, thereby resolving problems of incomplete target prediction and inaccurate positioning in a weakly supervised semantic segmentation condition.

(2) In the weakly supervised image semantic segmentation method based on an intra-class discriminator in the present invention, a result output by the first-level intra-class discriminator may be further finely adjusted by using methods such as a method of averaging in a superpixel and the conditional random field, and then input into the second-level intra-class discriminator, to obtain a feature code that is more suitable for discriminating foreground and background tasks, so that a more accurate semantic segmentation result can be obtained.

BRIEF DESCRIPTION OF THE DRAWINGS

Other features, objectives and advantages of this application will become more apparent upon reading the detailed description of the non-restrictive embodiments with reference to the following accompanying drawings.

DETAILED DESCRIPTION OF THE EMBODIMENTS

Figure 1:
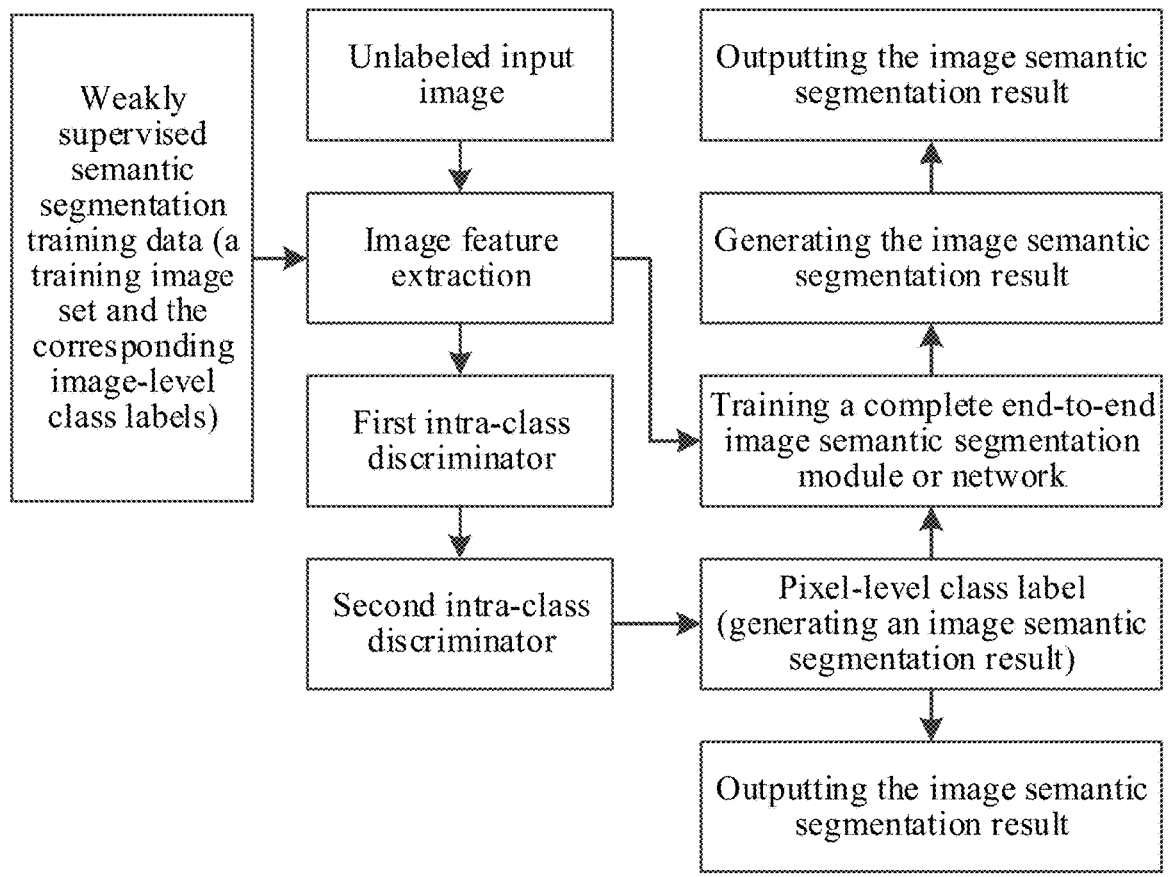
FIG. 1 is a schematic flowchart of a weakly supervised image semantic segmentation method based on an intra-class discriminator according to the present invention.

This application is further described in detail below with reference to the accompanying drawings and embodiments. It may be understood that the specific embodiments described herein are merely intended to explain the related invention, rather than limit the present invention. It should also be noted that, for convenience of description, only the parts related to the present invention are shown in the accompany drawings.

It should be noted that the embodiments in this application and features in the embodiments may be combined with each other if no conflict occurs. This application will be described in detail below with reference to the accompanying drawings and the embodiments.

The present invention provides a weakly supervised image semantic segmentation method based on an intra-class discriminator, and a provided weakly supervised semantic segmentation model based on an intra-class discriminator focuses on an interior of each image-level class.

Therefore, that it is difficult to obtain a relatively complete target segmentation result in a case of image-level weakly supervised annotation of data, and consequently, problems such as incomplete target prediction and inaccurate positioning under a weakly supervised semantic segmentation condition are caused may be effectively avoided. This method can effectively discriminate whether pixels of a same image class belong to a target foreground or a background, thereby obtaining a more accurate target segmentation estimation, and significantly improving performance of the weakly supervised semantic segmentation model.

The present invention provides a weakly supervised image semantic segmentation method based on an intra-class discriminator, where the semantic segmentation method includes:

extracting a feature image of a to-be-processed image through a feature extraction network, and obtaining an image semantic segmentation result of the to-be-processed image through an image semantic segmentation module, where the image semantic segmentation module is obtained through training based on a training image set and corresponding accurate pixel-level class labels;

the accurate pixel-level class labels are obtained through a first intra-class discriminator and a second intra-class discriminator based on the training image set and corresponding image-level class labels; the first intra-class discriminator and the second intra-class discriminator are separately constructed based on a deep network, and a method for training the first intra-class discriminator and the second intra-class discriminator includes:

step S10: extracting a feature image of each image in the training image set through the feature extraction network to obtain a training feature image set, and constructing a first loss function of the first intra-class discriminator and a second loss function of the second intra-class discriminator, respectively;

step S20: training the first intra-class discriminator based on the training feature image set, the corresponding image-level class labels and the first loss function to obtain preliminary pixel-level foreground and background labels corresponding to all classes of each image in the training image set;

step S30: training the second intra-class discriminator based on the training feature image set, the corresponding preliminary pixel-level foreground and background labels and the second loss function to obtain accurate pixel-level foreground and background labels corresponding to all the classes of each image in the training image set; and step S40: generating the accurate pixel-level class labels based on the accurate pixel-level foreground and background labels corresponding to all the classes of each image in the training image set and the corresponding image-level class labels.

To more clearly describe the weakly supervised image semantic segmentation method based on an intra-class discriminator according to the present invention, the following describes steps in the embodiments of the present invention in detail below with reference to FIG. 1.

Steps of a weakly supervised image semantic segmentation method based on an intra-class discriminator in an embodiment of the present invention are described in detail as follows.

A feature image of a to-be-processed image is extracted through a feature extraction network, and an image semantic segmentation result of the to-be-processed image is obtained through an image semantic segmentation module, where the image semantic segmentation module is obtained through training based on a training image set and corresponding accurate pixel-level class labels.

The accurate pixel-level class labels are obtained through a first intra-class discriminator and a second intra-class discriminator based on the training image set and corresponding image-level class labels; the first intra-class discriminator and the second intra-class discriminator are separately constructed based on a deep network, and a method for training the first intra-class discriminator and the second intra-class discriminator includes as follows.

Step S10: Extract a feature image of each image in the training image set through the feature extraction network to obtain a training feature image set, and construct a first loss function of the first intra-class discriminator and a second loss function of the second intra-class discriminator, respectively.

Figure 2:
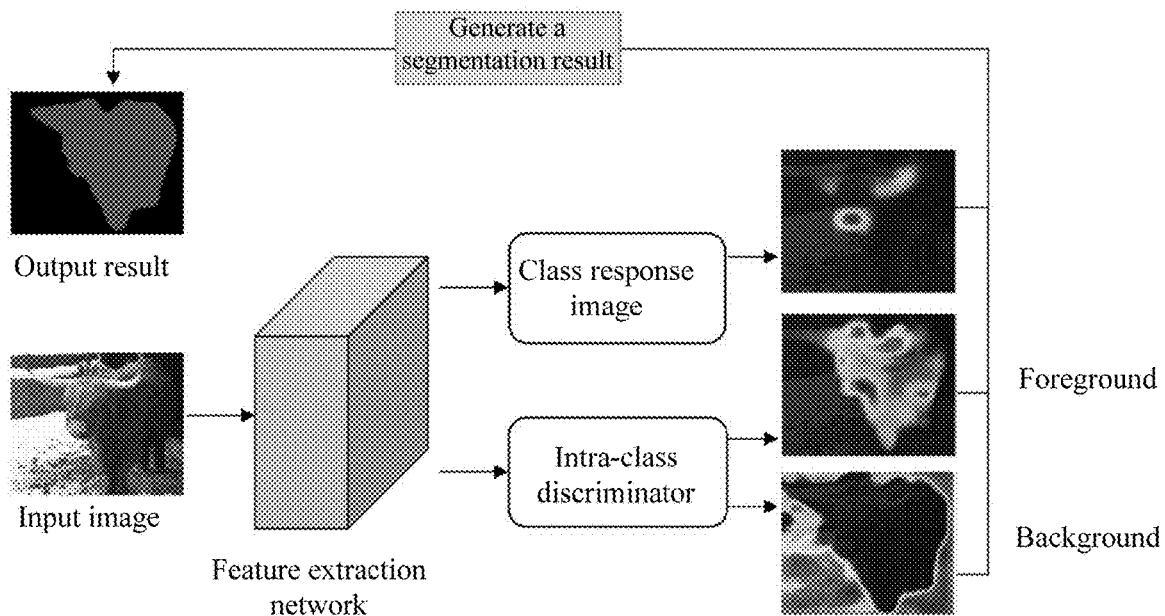
FIG. 2 is a schematic diagram of semantic segmentation of an intra-class discriminator in an embodiment of a weakly supervised image semantic segmentation method based on an intra-class discriminator according to the present invention.

FIG. 2 is a schematic diagram of semantic segmentation of an intra-class discriminator in the embodiment of the weakly supervised image semantic segmentation method based on an intra-class discriminator according to the present invention. A feature of an input image is obtained through the feature extraction network. A foreground and background of the image are obtained by using the intra-class discriminator. A segmentation result is generated and output in combination with a class response image. Herein, intra-class discriminator branches for intra-class discrimination and a class response image branch are included.

Step 1: For each input image, calculate a classification loss function by using the class response image branch in combination with an image label thereof, and obtain a gradient of parameters for backpropagation training;

Step 2: For the image in the foregoing step, train the intra-class discriminator branches in combination with the image label of the image, where the intra-class discriminator branches include the first intra-class discriminator and the second intra-class discriminator (may further include an intermediate process of performing fine adjustment).

Step 3: Steps 1 and 2 above are alternately or simultaneously performed, to training until convergence of an entire network is reached.

Step 4: After a network converges, a semantic segmentation result of the input image may be generated, where the result may be directly used as an output of semantic segmentation, or may be used to train a complete end-to-end image semantic segmentation module or network having better performance, and an output of the module or the network is used as a final semantic segmentation output.

Step S20: Train the first intra-class discriminator based on the training feature image set, the corresponding image-level class labels and the first loss function to obtain preliminary pixel-level foreground and background labels corresponding to all classes of each image in the training image set.

Step S21: For each image-level class label c of each feature image in the training feature image set, set a direction vector $w_c$, use a pixel in a direction of the vector $w_c$ as a foreground pixel of a class c, and use a pixel in an opposite direction of the vector $w_c$ as a background pixel of the class c.

A corresponding direction vector $w_c$ is learned for each class $w_c$. A direction pointed by the direction vector is used to indicate a foreground of a pixel of the class, and an opposite direction is used to indicate a background of the pixel of the class.

Step S22: Calculate a first loss value based on the direction vector $w_c$ and the training feature image set, and update $w_c$ based on the first loss value.

The direction vector is normalized to prevent the direction vector $w_c$ from being mapped to infinity during a training process of the first intra-class discriminator, as shown in equation (1):

$$w_c = \frac{\hat{w}_c}{\|\hat{w}_c\|} \qquad \text{equation (1)}$$

$w_c$ represents a direction vector of the image-level class label c after normalization, $\hat{w}_c$ represents a direction vector of the image-level class label c before normalization, and $\|\hat{w}_c\|$ represents a norm of $w_c$.

Based on the normalized direction vector $w_c$, the first loss function is as shown in equation (2):

$$L(X1) = -\frac{1}{NHW} \sum_i^N \sum_k^{HW} \sum_c^C y_{i,c}(w_c^T x_{i,k})^2 \qquad \text{equation (2)}$$

N represents a quantity of images in the training image set; H and W respectively represent a height and a width of a feature image of a training image; C represents a quantity of the image-level class labels in the training image set; $y_{i,c}$ represents an image-level label corresponding to a $c^{th}$ class of an $i^{th}$ image, and a value thereof is 1 if there is a class c in the image, or a value thereof is 0 if there is no class c in the image, $\hat{w}_c$ represents the direction vector of the image-level class label c before normalization, $$w_c = \frac{\hat{w}_c}{\|\hat{w}_c\|}$$

represents the direction vector of the image-level class label c after normalization, $w_c^T$ is a transpose of $w_c$; and $x_{i,k}$ represents a feature corresponding to a $k^{th}$ pixel position in a feature image of the $i^{th}$ image in the training image set.

The first intra-class discriminator may alternatively be trained by using a loss function based on L1-norm as shown in equation (3):

$$L(X1) = -\frac{1}{NHW} \sum_i^N \sum_k^{HW} \sum_c^C y_{i,c}|w_c^T x_{i,k}| \qquad \text{equation (3)}$$

The first intra-class discriminator may alternatively be trained by using a loss function based on a Sigmoid classifier as shown in equation (4):

$$L(X1) = -\frac{1}{NHW} \sum_{i=1}^N \sum_{k=1}^{HW} \sum_{c=1}^C y_{i,c} \qquad \text{equation (4)}$$
$$[Y_{i,k,c}\log\sigma(w_c^T x_{i,k}) + (1 - Y_{i,k,c})\log(1 - \sigma(w_c^T x_{i,k}))]$$

$Y_{i,k,c}$ represents a current output result of the first intra-class discriminator, and a value thereof is 1 or 0.

In addition to the foregoing loss functions, in other embodiments, other reasonable and effective loss functions may alternatively be selected as the first loss function of the first intra-class discriminator for training, and include but are not limited to a Softmax classification loss function, an MSE regression loss function, and the like. In the present invention, these are not described one by one in detail herein.

Step S23: Repeatedly perform step S21 and step S22 until a set first quantity of times of training is reached, to obtain the trained first intra-class discriminator and the preliminary pixel-level foreground and background labels corresponding to all the classes of each image in the training image set.

All pixels in each image are divided into two parts, namely, a foreground and a background, based on a class of the image, and which part is the foreground and which part is the background are determined based on a feature that the foreground usually has high classification significance, to obtain a final determining result of the foreground and the background to which all the pixels of the class appearing in the image belong.

Before step S30, the weakly supervised semantic segmentation method further includes: finely adjusting the preliminary pixel-level foreground and background labels, where a method thereof may include:

finely adjusting the preliminary pixel-level foreground and background labels by one or more methods including averaging in a superpixel and using a conditional random field.

A process of finely adjusting the preliminary pixel-level foreground and background labels by using the method of averaging in the superpixel is:

calculating a superpixel based on original input image, averaging prediction results of the first intra-class discriminator at a corresponding pixel position within each superpixel, and using an averaged result as an adjusted prediction result to generate a pixel-level foreground and background.

A process of finely adjusting the preliminary pixel-level foreground and background labels by using the conditional random field is:

using the prediction results of the first intra-class discriminator as first-order information, establishing second-order information in combination with information about the original input image according to the conditional random field method, and calculating and iterating an energy function in the conditional random field method to convergence, to obtain adjusted prediction results used to generate a pixel-level foreground and background.

Methods for finely adjusting the preliminary pixel-level foreground and background labels are not limited to the foregoing averaging in the superpixel and the conditional random field method. In other embodiments, other methods may alternatively be selected. Alternatively, the results obtained in the methods are averaged or majority voted and other manners are fused, and a fusion result is used as the finely adjusted prediction result. In the present invention, these are not described one by one in detail herein.

Step S30: Train the second intra-class discriminator based on the training feature image set, the corresponding preliminary pixel-level foreground and background labels and the second loss function to obtain accurate pixel-level foreground and background labels corresponding to all the classes of each image in the training image set.

Step S31: Calculate a second loss value based on the preliminary pixel-level foreground and background labels $B_{i,k,c}$ corresponding to all the classes of each image in the training image set, and the training feature image set, and updating a parameter of the feature extraction network based on the second loss value.

The second loss function is as shown in equation (5):

$$L(X2) = -\frac{1}{NHW}\sum_{i=1}^{N}\sum_{k=1}^{HW}\sum_{c=1}^{C} y_{i,c}$$
$$[B_{i,k,c}\log\sigma(S_{i,k,c}) + (1 - B_{i,k,c})\log(1 - \sigma(S_{i,k,c}))]$$

equation (5)

where N represents a quantity of images in the training image set; H and W respectively represent a high and a width of a feature image of a training image; C represents a quantity of image-level class labels in the training image set; $y_{i,c}$ represents an image-level label corresponding to a $c^{th}$ class of an $i^{th}$ image; $B_{i,k,c}$ represents pixel-level foreground and background prediction results of the first intra-class discriminator after fine adjustment; $S_{i,k,c}$ represents prediction results of the second intra-class discriminator; and $\sigma$ is a Sigmoid function.

Step S32: Repeatedly perform step S31 until a set second quantity of times of training is reached, to obtain the trained second intra-class discriminator and the accurate pixel-level foreground and background labels corresponding to all the classes of each image in the training image set.

Step S40: Generate the accurate pixel-level class labels based on the accurate pixel-level foreground and background labels corresponding to all the classes of each image in the training image set and the corresponding image-level class labels.

Figure 3:
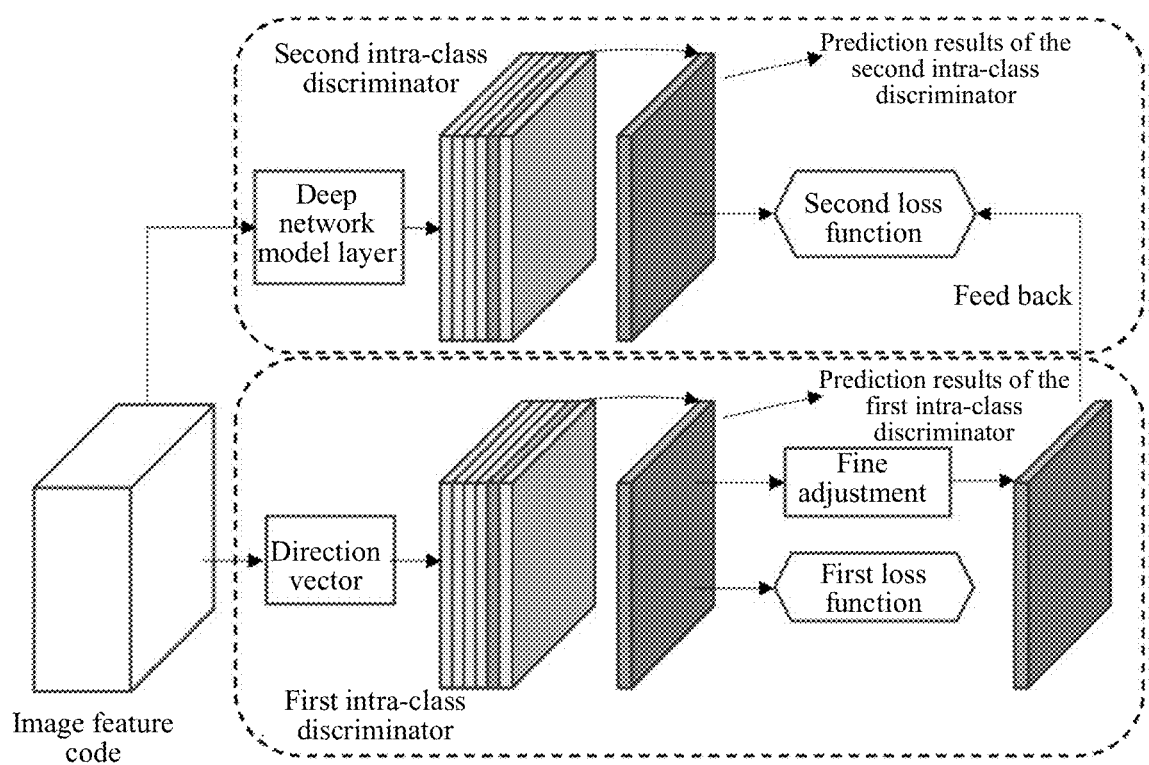
FIG. 3 is a schematic diagram of network training of an intra-class discriminator in an embodiment of a weakly supervised image semantic segmentation method based on an intra-class discriminator according to the present invention.

FIG. 3 is a schematic diagram of network training of the intra-class discriminator in the embodiment of the weakly supervised image semantic segmentation method based on an intra-class discriminator according to the present invention. Image feature codes of an image after feature extraction are respectively used as inputs of the first intra-class discriminator and the second intra-class discriminator, and an output of the first intra-class discriminator is finely adjusted and fed back to the second intra-class discriminator, to obtain a final output result in combination with an output result obtained by the second intra-class discriminator based on the image feature codes, where the first intra-class discriminator is trained based on the first loss function and the second intra-class discriminator is trained based on the second loss function.

The final output result of the second intra-class discriminator generated based on the foregoing step is integrated to form the accurate pixel-level class labels of the images in combination with class information of the images, and may alternatively be used as a semantic segmentation result of the images. Specifically, for an image with only one class, a foreground result of the second intra-class discriminator may be directly used as an annotation of the corresponding class, and a background result is used as a background annotation to complete annotation of semantic segmentation. For an image with a plurality of class labels, an area in which all corresponding classes are determined as a background may be used as a background annotation first. An area in which only one class is determined as a foreground and other classes are determined as a background is used as the class annotation. In a remaining area with a plurality of foreground class annotations, a class with a highest score is selected as a corresponding annotation based on corresponding scores $S_{i,k,c}$.

The semantic segmentation result obtained in the forgoing step may be directly output as a semantic segmentation result of a corresponding image; or may be used as a pixel-level annotation with a corresponding original image, and used as an input for training an end-to-end Image semantic segmentation module having better performance, and a final semantic segmentation output result is provided by the image semantic segmentation module for practical application or testing.

Different implementations may be used when a final semantic segmentation image is calculated based on the output result of the second intra-class discriminator. For example, a response of a conventional class response image may be fused with an output response of the intra-class discriminator provided in the present invention. The fused response is used to generate the final semantic segmentation image. Alternatively, an output of the intra-class discriminator may be first finely adjusted again by using methods such as a superpixel and the conditional random field, and then the final semantic segmentation image is generated. Alternatively, in a process of generating the semantic segmentation image, an area with a plurality of foreground classes to be determined may be left blank, and subsequently, iterative adjustment estimation and filling are performed by using a probability model such as the conditional random field in combination with information about an original image. Alternatively, a background is more accurately estimated in combination with a method such as an additional salience model based on the obtained result of the intra-class discriminator, and a more accurate and complete semantic segmentation image and the like are finally obtained through merging. In the present invention, these are not described one by one in detail herein.

A second embodiment of the present invention provides a weakly supervised image semantic segmentation system based on an intra-class discriminator. Based on the foregoing weakly supervised image semantic segmentation method based on an intra-class discriminator, the semantic segmentation system includes an input module, a feature extraction module, an image semantic segmentation module, and an output module, where the input module is configured to obtain a to-be-processed image or obtain a training image set and corresponding image-level class labels;

the feature extraction module is configured to extract a feature image of the to-be-processed image or extract a feature image set corresponding to the training image set;

the image semantic segmentation module is configured to obtain an image semantic segmentation result corresponding to the to-be-processed image based on the feature image corresponding to the to-be-processed image; and the output module is configured to output the image semantic segmentation result corresponding to the to-be-processed image, where the image semantic segmentation module is obtained through training based on the training image set and the corresponding accurate pixel-level class labels; and the accurate pixel-level class labels are obtained through a first intra-class discriminator, a second intra-class discriminator and a class label generation module based on the training image set and the corresponding image-level class labels;

the first intra-class discriminator includes a first loss calculation module and a first circulation module; the first loss calculation module calculates a first loss value based on a training feature image set, the corresponding image-level class labels, and a first loss function; and the first circulation module is configured to update a parameter of the first intra-class discriminator and perform cyclic training until a set first quantity of times of training is reached, to obtain the trained first intra-class discriminator and preliminary pixel-level foreground and background labels corresponding to all classes of each image in the training image set;

the second intra-class discriminator includes a second loss calculation module and a second circulation module; the second loss calculation module calculates a second loss value based on the training feature image set, corresponding preliminary pixel-level foreground and background labels of all the classes, and a second loss function; and the second circulation module is configured to update a parameter of the second intra-class discriminator and perform cyclic training until a set second quantity of times of training is reached, to obtain the trained second intra-class discriminator and accurate pixel-level foreground and background labels corresponding to all the classes of each image in the training image set; and the class label generation module is configured to generate the accurate pixel-level class labels based on the accurate pixel-level foreground and background labels corresponding to all the classes of each image in the training image set and the corresponding image-level class labels.

A person skilled in the art can clearly understand that, for convenience and brevity of description, reference can be made to corresponding processes in the foregoing method embodiment for specific working processes of the foregoing system and related descriptions. Details are not described herein again.

It should be noted that the weakly supervised image semantic segmentation system based on an intra-class discriminator provided in the foregoing embodiment only uses division into the foregoing functional modules as an example for description. During practical application, the foregoing functions may be allocated to different functional modules for completion according to needs. That is, the modules or steps in the embodiments of the present invention are further decomposed or combined. For example, the modules in the foregoing embodiments may be combined into one module, or may be further divided into a plurality of sub-modules to complete all or some of the foregoing functions. Names of the modules and steps in the embodiments of the present invention are only for distinguishing the modules or steps, and are not regarded as improper limitations on the present invention.

A storage apparatus according to a third embodiment of the present invention stores a plurality of programs, where the programs are configured to be loaded and executed by a processor to implement the foregoing weakly supervised image semantic segmentation method based on an intra-class discriminator.

A processing apparatus according to a fourth embodiment of the present invention includes a processor and a storage apparatus. The processor is configured to execute each program. The storage apparatus is configured to store a plurality of programs, where the programs are configured to be loaded and executed by the processor to implement the foregoing weakly supervised image semantic segmentation method based on an intra-class discriminator.

A person skilled in the art can clearly understand that, for convenience and brevity of description, reference can be made to corresponding processes in the foregoing method embodiment for specific working processes of the foregoing storage apparatus and processing apparatus and related descriptions. Details are not described herein again.

A person skilled in the art should be aware that the modules and method steps in the examples described with reference to the embodiments disclosed in the specification can be implemented by electronic hardware, computer software or a combination thereof, and the software modules and programs corresponding to the method steps may be placed in a random access memory (RANI), a memory, a read-only memory (ROM), an electrically programmable ROM, an electrically erasable programmable ROM, a register, a hard disk, a removable disk, a CD-ROM, or any other form of storage medium known in the technical field. To clearly describe the interchangeability between the electronic hardware and the software, compositions and steps of each example have been generally described according to functions in the foregoing descriptions. Whether the functions are performed by electronic hardware or software depends on particular applications and design constraint conditions of the technical solutions. A person skilled in the art may use different methods to implement the described functions for each specific application, but such implementation should not be considered to be beyond the scope of the present invention.

Terms such as "first" and "second" are intended to distinguish between similar objects, rather than describe or indicate a specific order or sequence.

Terms "include", "comprise" or any other variations thereof are intended to cover non-exclusive inclusions, so that a process, a method, an article, or a device/apparatus including a series of elements not only includes those elements, but also includes other elements that are not explicitly listed, or also includes inherent elements of the process, the method, the article or the device/apparatus.

The technical solutions in the present invention are described with reference to the example implementations shown in accompanying drawings. A person skilled in the art easily understands that the protection scope of the present invention is apparently not limited to these specific implementations. A skilled in the art can make equivalent changes or substitutions to the relevant technical features without departing from the principles of the present invention, and the technical solutions after these changes or substitutions should fall within the protection scope of the present invention.

What is claimed is:

1. A weakly supervised image semantic segmentation method based on an intra-class discriminator, comprising:
   extracting a feature image of a to-be-processed image through a feature extraction network, and obtaining an image semantic segmentation result of the to-be-processed image through an image semantic segmentation module, wherein the image semantic segmentation module is obtained through training based on a training image set and corresponding accurate pixel-level class labels;
   wherein, the corresponding accurate pixel-level class labels are obtained through a first intra-class discriminator and a second intra-class discriminator based on the training image set and corresponding image-level class labels; the first intra-class discriminator and the second intra-class discriminator are separately constructed based on a deep network, and a method for training the first intra-class discriminator and the second intra-class discriminator comprises:
   step S10: extracting a feature image of each image in the training image set through the feature extraction network to obtain a training feature image set, and constructing a first loss function of the first intra-class discriminator and a second loss function of the second intra-class discriminator, respectively;
   step S20: training the first intra-class discriminator based on the training feature image set, the corresponding image-level class labels and the first loss function to obtain preliminary pixel-level foreground and background labels corresponding to all classes of each image in the training image set, wherein step S20 further comprises:
   step S21: for each image-level class label c of each feature image in the training feature image set, setting a direction vector $w_c$, using a pixel in a direction of the direction vector $w_c$ as a foreground pixel of a class c, and using a pixel in an opposite direction of the direction vector $w_c$ as a background pixel of the class c;
   step S22: calculating a first loss value based on the direction vector w, and the training feature image set, and updating $w_c$ based on the first loss value; and
   step S23: repeatedly performing step S21 and step S22 until a set first quantity of times of training is reached, wherein a trained first intra-class discriminator and the preliminary pixel-level foreground and background labels corresponding to all the classes of each image in the training image set are obtained;
   step S30: training the second intra-class discriminator based on the training feature image set, the corresponding preliminary pixel-level foreground and background labels and the second loss function to obtain accurate pixel-level foreground and background labels corresponding to all the classes of each image in the training image set; and
   step S40: generating the accurate pixel-level class labels based on the accurate pixel-level foreground and background labels corresponding to all the classes of each image in the training image set and the corresponding image-level class labels.

2. The weakly supervised image semantic segmentation method based on the intra-class discriminator according to claim 1, wherein step S30 comprises:
   step S31: calculating a second loss value based on the preliminary pixel-level foreground and background labels $B_{i,k,c}$ corresponding to all the classes of each image in the training image set, and the training feature image set, and updating a parameter of the feature extraction network based on the second loss value; and
   step S32: repeatedly performing step S31 until a set second quantity of times of training is reached, wherein a trained second intra-class discriminator and the accurate pixel-level foreground and background labels corresponding to all the classes of each image in the training image set are obtained.

3. The weakly supervised image semantic segmentation method based on the intra-class discriminator according to claim 1, wherein before step S30, the weakly supervised semantic segmentation method further comprises: finely adjusting the preliminary pixel-level foreground and background labels, wherein a method for finely adjusting the preliminary pixel-level foreground and background labels comprises:
   finely adjusting the preliminary pixel-level foreground and background labels by one or more methods comprising averaging in a superpixel and using a conditional random field.

4. The weakly supervised image semantic segmentation method based on the intra-class discriminator according to claim 1, wherein the first loss function is:

$$L(X1) = -\frac{1}{NHW}\sum_i^N \sum_k^{HW} \sum_c^C y_{i,c}(w_c^T x_{i,k})^2$$

wherein N represents a quantity of images in the training image set; H and W respectively represent a height and a width of a feature image of a training image; C represents a quantity of the image-level class labels in the training image set; $y_{i,c}$ represents an image-level label corresponding to a $c^{th}$ class of an $i^{th}$ image, $\hat{w}_c$ epresents a direction vector of an image-level class label c before normalization, $$w_c = \frac{\hat{w}_c}{\|\hat{w}_c\|}$$

represents a direction vector of the image-level class label c after normalization, wc is a transpose of $w_c$; and $x_{i,k}$ represents a feature corresponding to a $k^{th}$ pixel position in a feature image of the $i^{th}$ image in the training image set.

5. The weakly supervised image semantic segmentation method based on the intra-class discriminator according to claim 1, wherein the first intra-class discriminator and the second intra-class discriminator are further allowed to be trained by using one of a Softmax classification loss function and a mean square error (MSE) regression loss function.

6. A weakly supervised image semantic segmentation system based on an intra-class discriminator, using the weakly supervised image semantic segmentation method based on the intra-class discriminator according to claim 1, comprising an input module, a feature extraction module, an image semantic segmentation module, and an output module, wherein the input module is configured to obtain a to-be-processed image or obtain a training image set and corresponding image-level class labels;

the feature extraction module is configured to extract a feature image of the to-be-processed image or extract a feature image set corresponding to the training image set;

the image semantic segmentation module is configured to obtain an image semantic segmentation result corresponding to the to-be-processed image based on the feature image corresponding to the to- be-processed image; and the output module is configured to output the image semantic segmentation result corresponding to the to- be-processed image, wherein the image semantic segmentation module is obtained through training based on the training image set and corresponding accurate pixel-level class labels; and the accurate pixel-level class labels are obtained through a first intra-class discriminator, a second intra-class discriminator and a class label generation module based on the training image set and the corresponding image-level class labels;

the first intra-class discriminator comprises a first loss calculation module and a first circulation module; the first loss calculation module calculates a first loss value based on a training feature image set, the corresponding image-level class labels, and a first loss function; and the first circulation module is configured to update a parameter of the first intra-class discriminator and perform a first cyclic training until a set first quantity of times of training is reached, wherein a trained first intra-class discriminator and preliminary pixel-level foreground and background labels corresponding to all classes of each image in the training image set are obtained;

the second intra-class discriminator comprises a second loss calculation module and a second circulation module; the second loss calculation module calculates a second loss value based on the training feature image set, the preliminary pixel-level foreground and background labels corresponding to all the classes of each image in the training image set, and a second loss function; and the second circulation module is configured to update a parameter of the second intra-class discriminator and perform a second cyclic training until a set second quantity of times of training is reached, wherein a trained second intra-class discriminator and accurate pixel-level foreground and background labels corresponding to all the classes of each image in the training image set are obtained; and the class label generation module is configured to generate the accurate pixel-level class labels based on the accurate pixel-level foreground and background labels corresponding to all the classes of each image in the training image set and the corresponding image-level class labels.

7. The weakly supervised image semantic segmentation system based on the intra-class discriminator according to claim 6, wherein step S30 comprises:

step S31: calculating a second loss value based on the preliminary pixel-level foreground and background labels $B_{i,k,c}$ corresponding to all the classes of each image in the training image set, and the training feature image set, and updating a parameter of the feature extraction network based on the second loss value; and step S32: repeatedly performing step S31 until a set second quantity of times of training is reached, wherein a trained second intra-class discriminator and the accurate pixel-level foreground and background labels corresponding to all the classes of each image in the training image set are obtained.

8. The weakly supervised image semantic segmentation system based on the intra-class discriminator according to claim 6, wherein before step S30, the weakly supervised semantic segmentation method further comprises: finely adjusting the preliminary pixel-level foreground and background labels, wherein a method for finely adjusting the preliminary pixel-level foreground and background labels comprises:

finely adjusting the preliminary pixel-level foreground and background labels by one or more methods comprising averaging in a superpixel and using a conditional random field.

9. The weakly supervised image semantic segmentation system based on the intra-class discriminator according to claim 8, wherein the second loss function is:

$$L(X2) = -\frac{1}{NHW} \sum_{i=1}^{N} \sum_{k=1}^{HW} \sum_{c=1}^{C} y_{i,c}[B_{i,k,c}\log\sigma(S_{i,k,c}) + (1 - B_{i,k,c})\log(1 - \sigma(S_{i,k,c}))]$$

wherein N represents a quantity of images in the training image set; HW represents a quantity of pixels in a feature image of a training image; C represents a quantity of image-level class labels in the training image set; $y_{i,c}$ represents an image-level label corresponding to a $c^{th}$ class of an $i^{th}$ image; $B_{i,k,c}$ represents pixel-level foreground and background prediction results of the first intra-class discriminator after fine adjustment; $S_{i,k,c}$ represents prediction results of the second intra-class discriminator; and σ is a Sigmoid function.

10. The weakly supervised image semantic segmentation system based on the intra-class discriminator according to claim 6, wherein the first loss function is:

$$L(X1) = -\frac{1}{NHW}\sum_{i}^{N}\sum_{k}^{HW}\sum_{c}^{C} y_{i,c}(w_c^T x_{i,k})^2$$

wherein N represents a quantity of images in the training image set; H and W respectively represent a height and a width of a feature image of a training image; C represents a quantity of the image-level class labels in the training image set; $y_{i,c}$ represents an image-level label corresponding to a $c^{th}$ class of an $i^{th}$ image, $\hat{w}_c$ represents a direction vector of an image-level class label c before normalization $$w_c = \frac{\hat{w}_c}{\|\hat{w}_c\|}$$

represents a direction vector of the image-level class label c after normalization, $w_c^T$ is a transpose of $w_c$; and $x_{i,k}$ represents a feature corresponding to a $k^{th}$ pixel position in a feature image of the $i^{th}$ image in the training image set.

11. The weakly supervised image semantic segmentation system based on the intra-class discriminator according to claim 6, wherein the first intra-class discriminator and the second intra-class discriminator are further allowed to be trained by using one of a Softmax classification loss function and a mean square error (MSE) regression loss function.

12. A non-transitory storage medium, storing a plurality of programs, wherein the plurality of programs are configured to be loaded and executed by a processor to implement the weakly supervised image semantic segmentation method based on the intra-class discriminator according to claim 1.

13. The non-transitory storage medium according to claim 12, wherein step S30 comprises: step S31: calculating a second loss value based on the preliminary pixel-level foreground and background labels corresponding to all the classes of each image in the training image set, and the training feature image set, and updating a parameter of the feature extraction network based on the second loss value; and step S32: repeatedly performing step S31 until a set second quantity of times of training is reached, wherein a trained second intra-class discriminator and the accurate pixel-level foreground and background labels corresponding to all the classes of each image in the training image set are obtained.

14. The non-transitory storage medium according to claim 12, wherein before step S30, the weakly supervised semantic segmentation method further comprises: finely adjusting the preliminary pixel-level foreground and background labels, wherein a method for finely adjusting the preliminary pixel-level foreground and background labels comprises: finely adjusting the preliminary pixel-level foreground and background labels by one or more methods comprising averaging in a superpixel and using a conditional random field.

15. The ster-age-appar-ftEtts non-transitory storage medium according to claim 12, wherein the first loss function is:

$$L(X1) = -\frac{1}{NHW}\sum_i^N \sum_k^{HW} \sum_c^C y_{i,c}(w_c^T x_{i,k})^2$$

wherein N represents a quantity of images in the training image set; H and W respectively represent a height and a width of a feature image of a training image; C represents a quantity of image-level class labels in the training image set; $y_{i,c}$ represents an image-level label corresponding to a $c^{th}$ class of an $i^{th}$ image, $\hat{w}_c$ represents a direction vector of an image-level class label C before normalization, $$w_c = \frac{\hat{w}_c}{\|\hat{w}_c\|}$$

represents a direction vector of an image-level class label c after normalization, $w_c^T$ is a transpose of $w_c$; and $x_{i,k}$ represents a feature corresponding to a $k^{th}$ pixel position in a feature image of the $i^{th}$ image in the training image set.

16. A processing apparatus, comprising:
a processor, configured to execute each program; and
a non-transitory storage medium, configured to store a plurality of programs;
wherein, the plurality of programs are configured to be loaded and executed by the processor to implement the weakly supervised image semantic segmentation method based on the intra-class discriminator according to claim 1.

17. A weakly supervised image semantic segmentation method based on the intra-class discriminator comprising:
extracting a feature image of a to-be-processed image through a feature extraction network, and obtaining an image semantic segmentation result of the to-be-processed image through an image semantic segmentation module, wherein the image semantic segmentation module is obtained through training based on a training image set and corresponding accurate pixel-level class labels;
wherein, the corresponding accurate pixel-level class labels are obtained through a first intra-class discriminator and a second intra-class discriminator based on the training image set and corresponding image-level class labels; the first intra-class discriminator and the second intra-class discriminator are separately constructed based on a deep network, and a method for training the first intra-class discriminator and the second intra-class discriminator comprises:
step S10: extracting a feature image of each image in the training image set through the feature extraction network to obtain a training feature image set, and constructing a first loss function of the first intra-class discriminator and a second loss function of the second intra-class discriminator, respectively;
step S20: training the first intra-class discriminator based on the training feature image set, the corresponding image-level class labels and the first loss function to obtain preliminary pixel-level foreground and background labels corresponding to all classes of each image in the training image set
step S30: training the second intra-class discriminator based on the training feature image set, the corresponding preliminary pixel-level foreground and background labels and the second loss function to obtain accurate pixel-level foreground and background labels corresponding to all the classes of each image in the training image set, wherein before step S30, the weakly supervised semantic segmentation method further comprises: finely adjusting the preliminary pixel-level foreground and background labels, wherein a method for finely adjusting the preliminary pixel-level foreground and background labels comprises:
finely adjusting the preliminary pixel-level foreground and background labels by one or more methods comprising averaging in a superpixel and using a conditional random field; and
step S40: generating the accurate pixel-level class labels based on the accurate pixel-level foreground and background labels corresponding to all the classes of each image in the training image set and the corresponding image-level class labels, wherein the second loss function is:

$$L(X2) = -\frac{1}{NHW} \sum_{i=1}^{N} \sum_{k=1}^{HW} \sum_{c=1}^{C} y_{i,c}[B_{i,k,c}\log\sigma(S_{i,k,c}) + (1 - B_{i,k,c})\log(1 - \sigma(S_{i,k,c}))]$$

wherein N represents a quantity of images in the training image set; HW represents a quantity of pixels in a feature image of a training image; C represents a quantity of image-level class labels in the training image set; $y_{i,c}$ represents an image-level label corresponding to a $c^{th}$ class of an $i^{th}$ image; $B_{i,k,c}$ represents pixel-level foreground and background prediction results of the first intra-class discriminator after fine adjustment; $S_{i,k,c}$ represents prediction results of the second intra-class discriminator; and σ is a Sigmoid function.

\* \* \* \* \*